United States Patent [19]
Young

[11] Patent Number: 6,064,052
[45] Date of Patent: May 16, 2000

[54] IMAGE SCANNER

[76] Inventor: Chin-Zhung Young, No. 128, Lane 386, Kaofeng Rd., Hsinchu City, Taiwan

[21] Appl. No.: 09/053,364

[22] Filed: Apr. 1, 1998

[51] Int. Cl.$^7$ .................................................. H04N 1/04
[52] U.S. Cl. ...................... 250/208.1; 250/234; 250/235; 358/483; 358/487
[58] Field of Search ................................. 250/208.1, 234, 250/235; 358/474, 482, 483, 487, 494, 497

[56] References Cited

U.S. PATENT DOCUMENTS

5,814,809  9/1998  Han ...................................... 250/208.1

Primary Examiner—John R Lee
Attorney, Agent, or Firm—Holland & Hart LLP

[57] ABSTRACT

An image scanner includes a base, a glass plate disposed on the base for receiving a document to be scanned, a transmitting stand disposed in the base and being capable of moving laterally therein, a top shell disposed above the base and engaged with the transmitting stand and an optical sensing unit disposed in the top shell, so that the image scanner can directly scan the document and effectively obviate the optical error problem which occurs when a glass plate is located between a document to be scanned and an image sensor as in the prior art.

9 Claims, 7 Drawing Sheets

IMAGE SCANNER

BACKGROUND OF THE INVENTION

1. Field of the Invention

The present invention relates to an image scanner and, in particular, to an image scanner which can directly scan a document and effectively obviate an optical error problem arising from a sheet of glass located between a document to be scanned and an image sensor in the prior art.

2. Description of the Prior Art

At present, almost all the structural designs of the existing image scanners apply the principles of a photocopy machine. That is, a glass plate is used as a platform for receiving an image document to be scanned. A light source of a bar type locates under the glass plate and moves from a first side to a second side thereof so that the light is emitted onto every part of the document. Then, a reflecting mechanism reflects the light which is reflected from the document to an image sensor of a CCD (Charge-Coupled Device) or CIS (Contact Image Sensor) type, which locates under the glass plate, so that the image data on the document can be scanned and obtained.

As the designs of the existing image scanners are almost all of the above type, the only aspect which can be changed is probably the choice of the image sensor. One of the most widely-used image sensors is the image sensor of a CIS type. Such a CIS image sensor utilizes densely-arranged light-guiding posts to directly transmit the light which represents a scanned image to the sensors for lowering the optical transmission toss, promoting the receiving quality and only utilizing light sources of lower intensity.

However, even when an image scanner adopts a CIS image sensor, the light transmission path for receiving a scanned image remains the same, that is, the light must pass through the glass plate to and from a document. The existence of the glass in the light transmission path will cause a degree of optical loss and error so that the quality of a scanned image is flawed. Therefore, there is a need to have an image scanner which can substantially obviate the above-described problems occurring in the prior art.

SUMMARY OF THE INVENTION

One of the purposes of the present invention is to provide an image scanner for obviating the problems of optical loss and error arising from the existence of the glass in a light transmission path of scanning, wherein an image sensing means is disposed within a top shell capable of reciprocating above the glass so that the glass does not exist in the light transmission path of scanning.

Another of the purposes of the present invention is to provide an image scanner including a top shell which extends to the front and rear walls of a base and is coupled to a transmitting means so that the top shell can move laterally as being driven by the transmitting means.

Still another of the purposes of the present invention is to provide an image scanner including removable pressing means disposed at the edges of a glass plate for clamping a document to be scanned.

Still another of the purposes of the present invention is to provide an image scanner including a transmitting means inside a base thereof, said transmitting means including a lamp to provide light for scanning a document of a transparent type, such as a transparent film.

Still another of the purposes of the present invention is to provide an image scanner including lamps disposed at the edges of a glass plate so that the image scanner can function as a tracing plate.

Further purposes and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
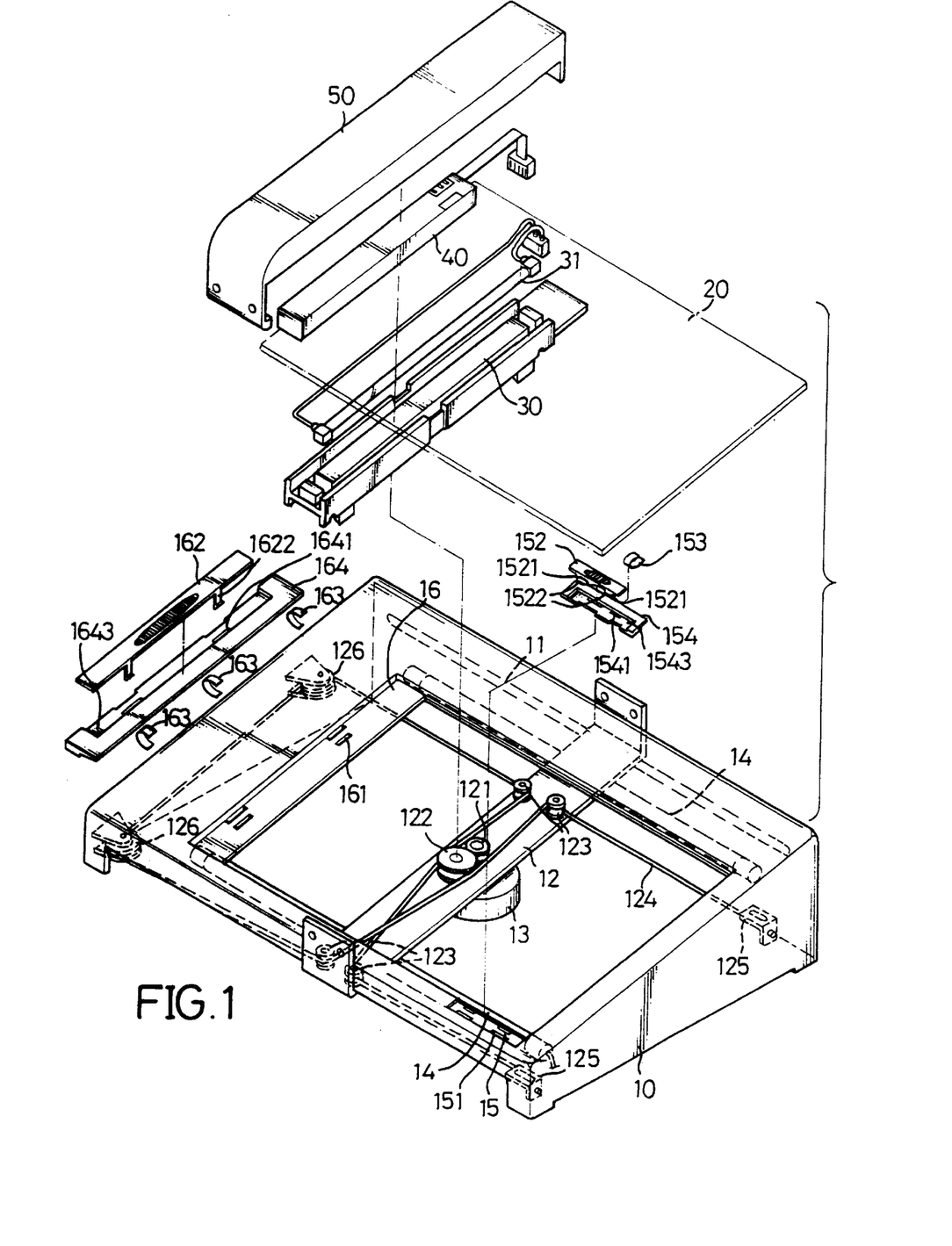
FIG. 1 is an exploded view of an image scanner according to a preferred embodiment of the present application.

As shown in FIG. 1, an image scanner according a preferred embodiment of the present application includes a hollow base 10, a transmitting stand 12 capable of laterally moving inside the base 10, a bottom lamp seat 30 disposed above and partly covering the transmitting stand 12, a bottom lamp 31 located in the bottom lamp seat 30, a glass plate 20 disposed above the hollow base 10, two pressing strips 154, 164 respectively disposed at a left side and a front side of the glass plate 20, a top shell 50 which extends to a front wall and a rear wall of the base 10 and is coupled to the transmitting stand 12 in order to move laterally when driven by the transmitting stand 12, and a linear optical sensor 40 disposed within the top shell 50.

Figure 2:
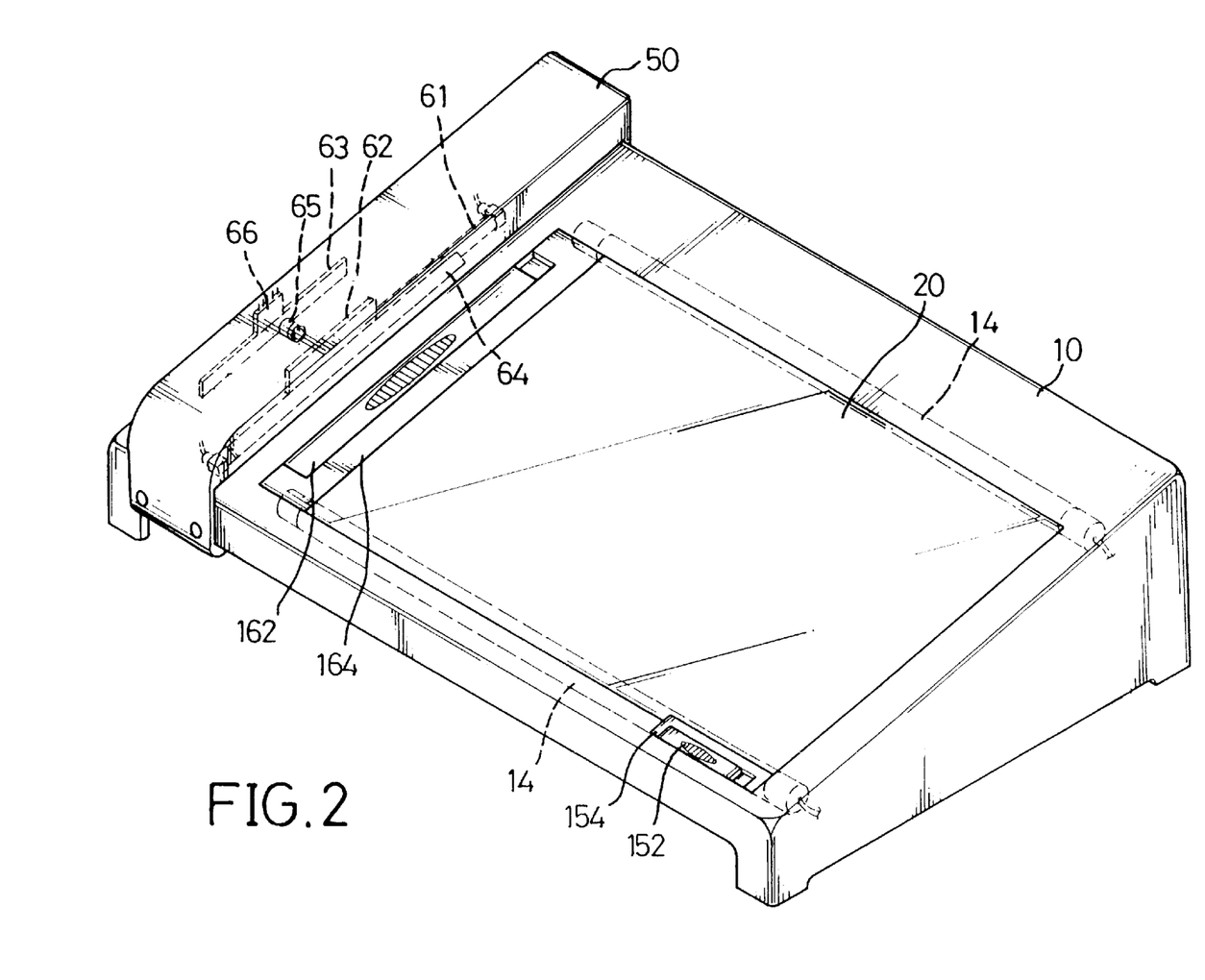
FIG. 2 shows a base and a transmitting stand of the image scanner of FIG. 1.

As shown in FIGS. 1 and 2, a slot 11 is defined in the rear wall of the base 10 for supporting and allowing the transmitting stand 12 to move therealong. A transmitting motor 13, a driving gear wheel 121 and a driven gear wheel 122 are each provided in a middle of the transmitting stand 12. Four pulleys 123 are further disposed on the front and rear sides of the transmitting stand 12.

Figure 3:
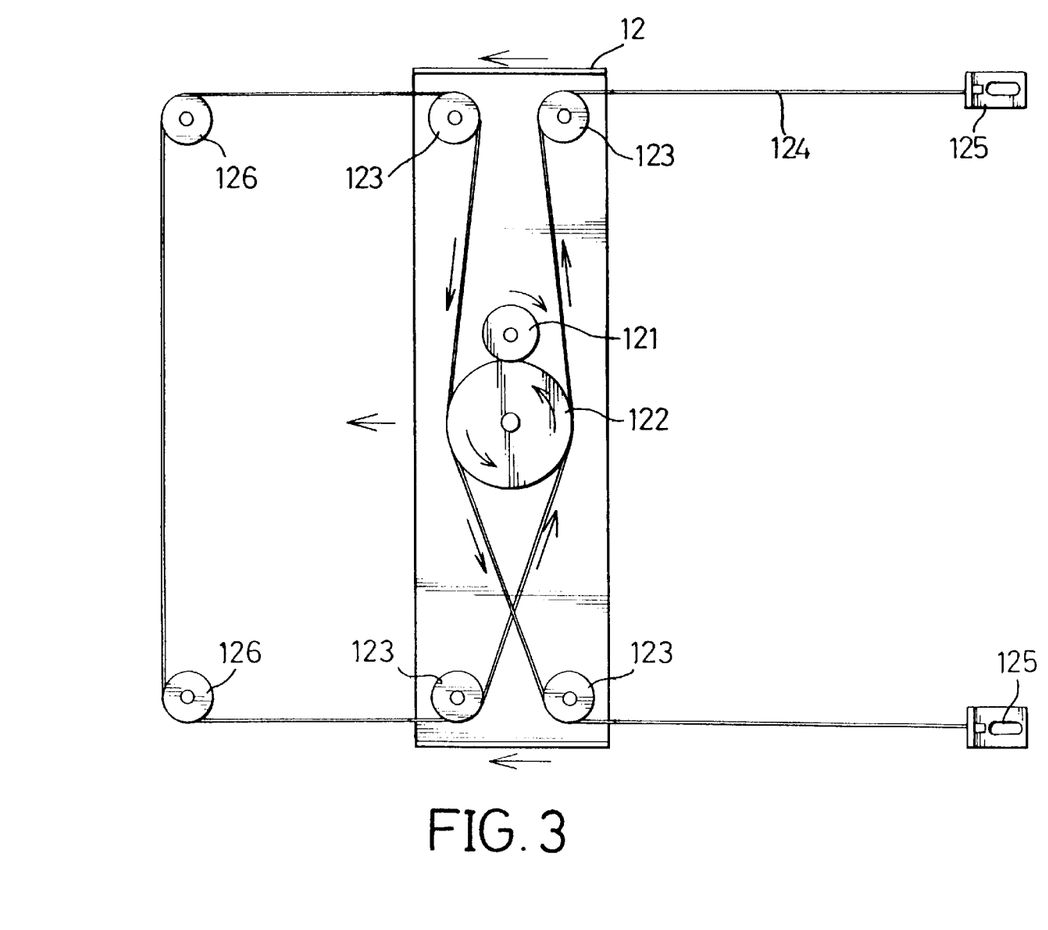
FIG. 3 illustrates the movement of the transmitting stand of the image scanner of FIG. 1.

Two adjusting seats 125 and two wheels 126 are respectively disposed on four corners of the hollow base 10. Referring to FIG. 3, in this preferred embodiment, a cord 124 extends from a fixed condition at one of two adjusting seats 125 to extend to sequentially reeve over a first of the pulleys 123, the driven gear wheel 122, a second of the pulleys 123, a first of the wheels 126, the other of the wheels 126, a third of the pulleys 123, the driven gear wheel 122, the other pulley 123 and is securely fixed at the other adjusting seat 125. The winding of the cord 124 presents an X shape at the driven gear wheel 122 when viewed from the top.

As shown in FIG. 3, when the driven gear wheel 122 turns in the direction of the arrows marked thereon, the entire transmitting stand 12 will move toward the left side of the base 10 when viewed from the top. Similarly, when the driven gear wheel 122 turns in a direction opposite to the arrows marked thereon, the transmitting stand 12 will move toward the right side of the base 10. Accordingly, the translating movement of the transmitting stand 12 can be controlled by the transmitting motor 13 through the driving gear wheel 121 and the driven gear wheel 122.

The bottom lamp 31 is fitted into the bottom lamp seat 30 which is disposed on and covers the transmitting stand 12, as shown in FIG. 2. As the bottom lamp seat 30 is located under the glass plate 20, the lamp 31 fitted therein can serve as a light source while scanning a transparent document placed on the glass plate 20. However, for most cases wherein a normal document is scanned, the light necessary for scanning is directly provided by the linear optical sensor 40.

Figure 5:
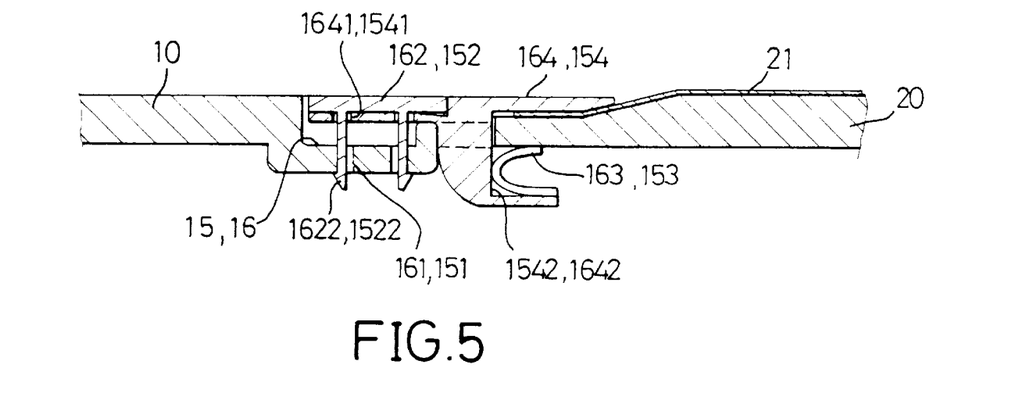
FIG. 5 is a cross-sectional view of a part of the image scanner of the present application in a document clamping position.

As shown in FIGS. 1 and 5, two fitting grooves 15, 16 each having several slots 151, 161 defined therein are disposed respectively at a left side and a front-right side depressions which are formed on the base 10 and are used for receiving the glass plate 20.

Further referring to FIG. 5, the two pressing strips 154, 164 respectively define slots 1541, 1641 corresponding to the slots 151, 161 of the grooves 15, 16. At a bottom side of the pressing strips 154, 164, two grooves 1542, 1642 are respectively defined for receiving elastic pieces 153, 163 therein. Two control pieces 152, 162 are respectively formed with anti-slip ridges on a top surface thereof and hooks 1522, 1622 at the bottom thereof. Therefore, the control pieces 152, 162 and pressing strips 154, 164 can be assembled with the grooves 15, 16 by means of the slots 1541, 1641, 151, 161 and the hooks 1522, 1622 in a manner as shown in FIG. 5. Preferably, the pressing strips 154, 164 are respectively formed with recesses 1543, 1643 thereon for receiving the control pieces 152, 162.

Figure 6:
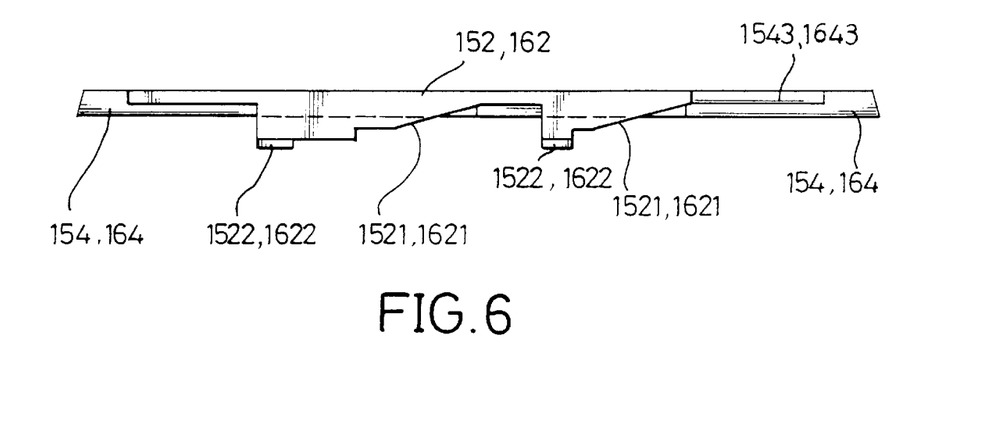
FIG. 6 is a schematic view illustrating a part of the image scanner of the present application in a document clamping position.

As shown in FIG. 6, ramps 1521, 1621 are respectively formed at a downward extending portion of the hooks 1522, 1622. FIG. 6 further shows the relationship between the control pieces 152, 162 and the pressing strips 154, 164 when a document 21 is clamped between the plate 20 and the pressing strips 154, 164. Therefore, the clamping of the document 21 is achieved by elasticity of the elastic pieces 153, 163 fitted in the pressing strips 154, 164, as shown in FIG. 5.

Figure 7:
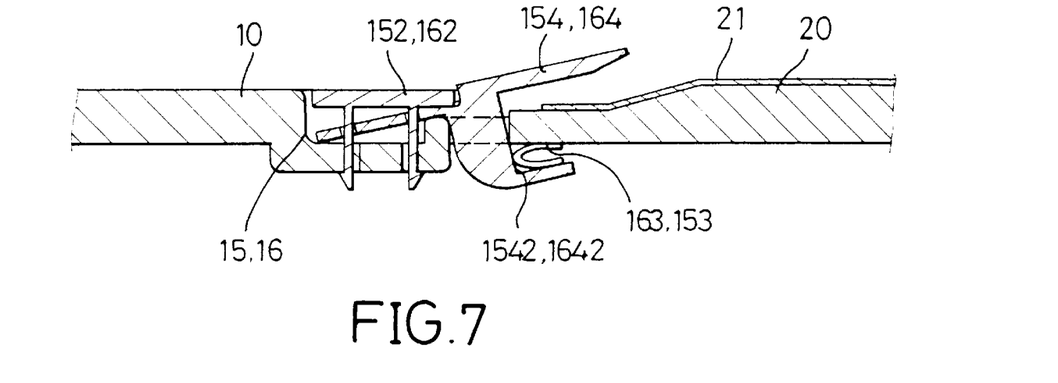
FIG. 7 is a cross-sectional view of a part of the image scanner of the present application in a document releasing position.
Figure 8:
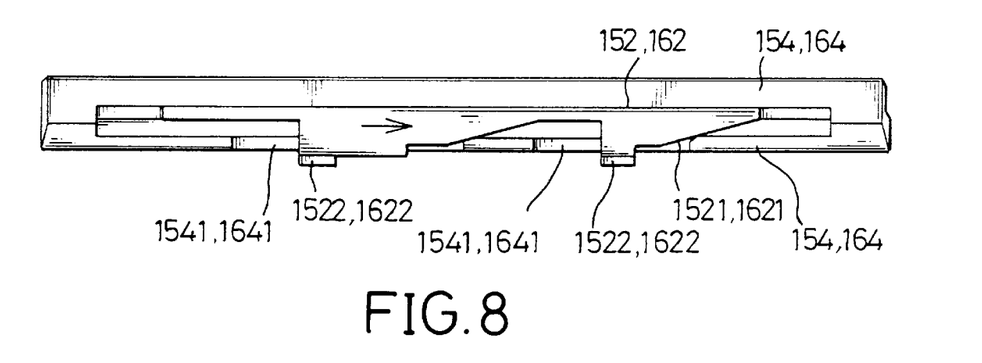
FIG. 8 is a schematic view illustrating a part of the image scanner of the present application in a document releasing position.

When a user intends to release the document 21 which is in a clamped condition, referring to FIG. 8, the control pieces 152, 162 are respectively urged in the direction as shown by the arrow. Then, the ramps 1521, 1621 of the control pieces 152, 162 will respectively push against respective top edges partly defining the corresponding slots 151, 161 of the pressing strips 154, 164. Therefore, one side of the pressing strips 154, 164, which is used to clamp the document 21, will cock, so that the document 21 can be easily taken out. FIG. 7 also clearly shows the cocking phenomenon of the pressing strips 154, 164 when the control pieces 152, 162 are urged in a way as describe above.

On the contrary, when a user wishes to install a document 21 on the glass plate 20, the user can simply insert the document 21 under the cocking side of the pressing strips 154, 164 and urge the control pieces 152, 162 in a direction opposite to the one as shown by the arrow, so that the document 21 is fixedly clamped between the plate 20 and the pressing strips 154, 164, as shown in FIGS. 5, 6.

Referring to FIG. 1, the top shell 50 can be combined with the transmitting stand 12 by using screws (not shown) so that the top shell 50 can also move laterally as being driven by the transmitting stand 12. The linear optical sensor 40 disposed within the top shell 50 is mainly composed of the components of a CIS type image sensor in this preferred embodiment. Particularly, the light emitting and receiving sides of the optical sensor 40 both face downwardly.

Figure 9:
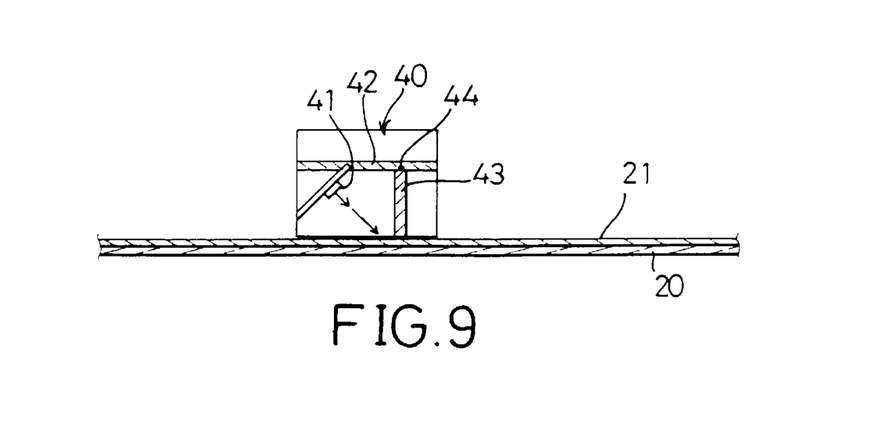
FIG. 9 illustrates the light transmission path in the linear optical sensor which is used in the image scanner of FIG. 1.

FIG. 9 is a cross-sectional view illustrating the light transmission path of the linear optical sensor 40 according to the present invention. In this preferred embodiment, the linear optical sensor 40 includes a plurality of light emitting units 41, a circuit board 42, a plurality of light-guiding posts 43 and a plurality of sensors 44 mounted on the circuit board 42. As shown in FIG. 9, the light emitting units 41 emit light downwardly to a document 21. Then, the light reflected from the document 21 is received by the sensors 44 receiving sides of which also face downwardly through the light-guiding posts 43.

Therefore, as describe above, the document 21 to be scanned is first clamped between the glass plate 20 and the pressing strips 154, 164 with the face of the document 21, which is intended to be scanned, facing upwardly. The optical sensor 40 which is disposed in the top shell 50 can perform a contact-type scanning on the document 21 placed on the glass plate 20. Accordingly, the scanning of the document 21 can be achieved by the optical sensor 40 disposed in the top shell 50 while the top shell 50 is driven by the transmitting stand 12 to move from one side of the scanner to another side thereof.

Figure 4:
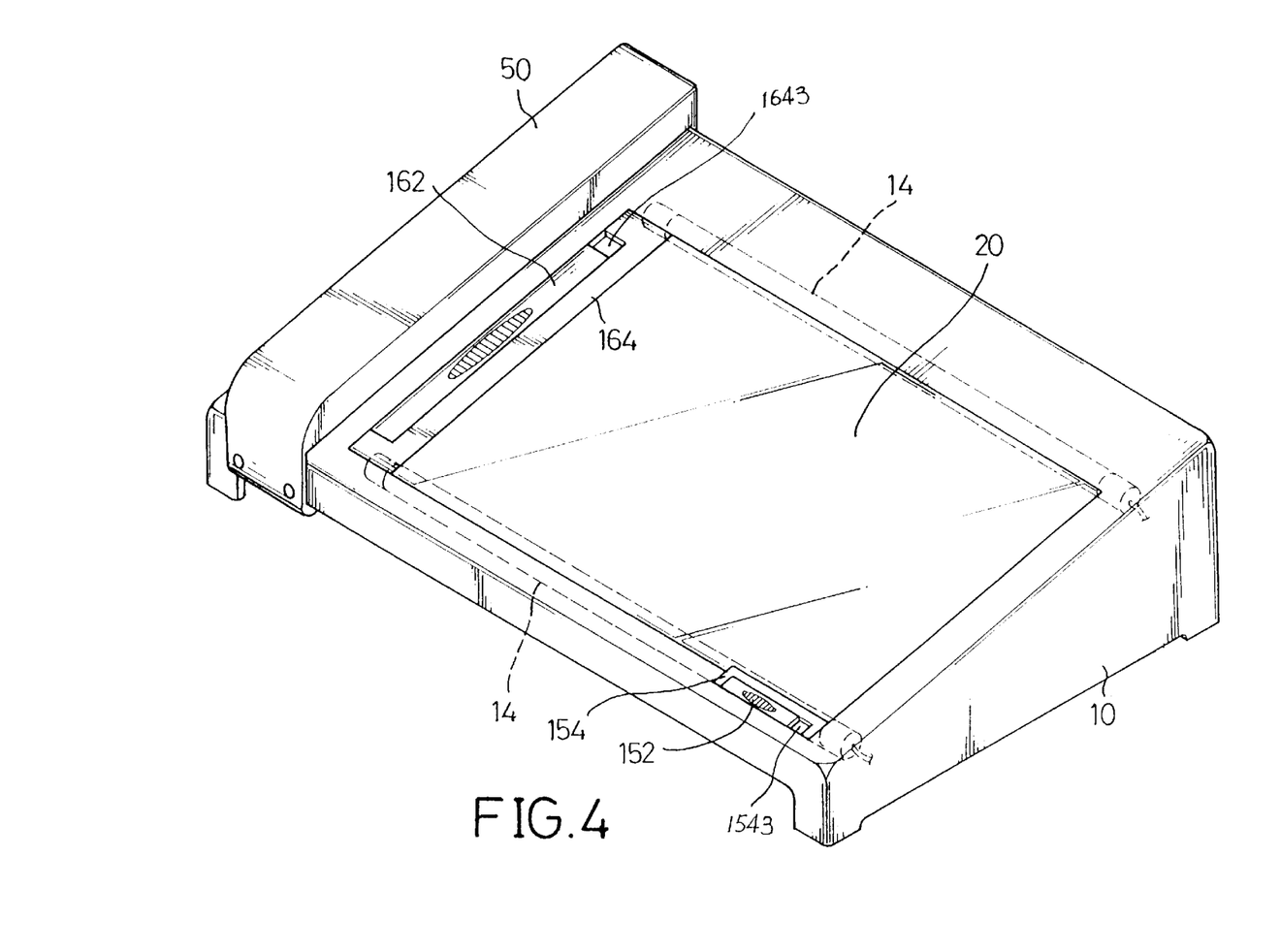
FIG. 4 is a perspective view of the image scanner according to the preferred embodiment of the present application.

The assembled image scanner according to this preferred embodiment of the present application is shown in FIG. 4. Furthermore, as shown in FIG. 4, lamps 14 can be disposed respectively at the front and rear sides of the base 10 for enabling the image scanner of the present invention to serve as a tracing plate.

Figure 10:
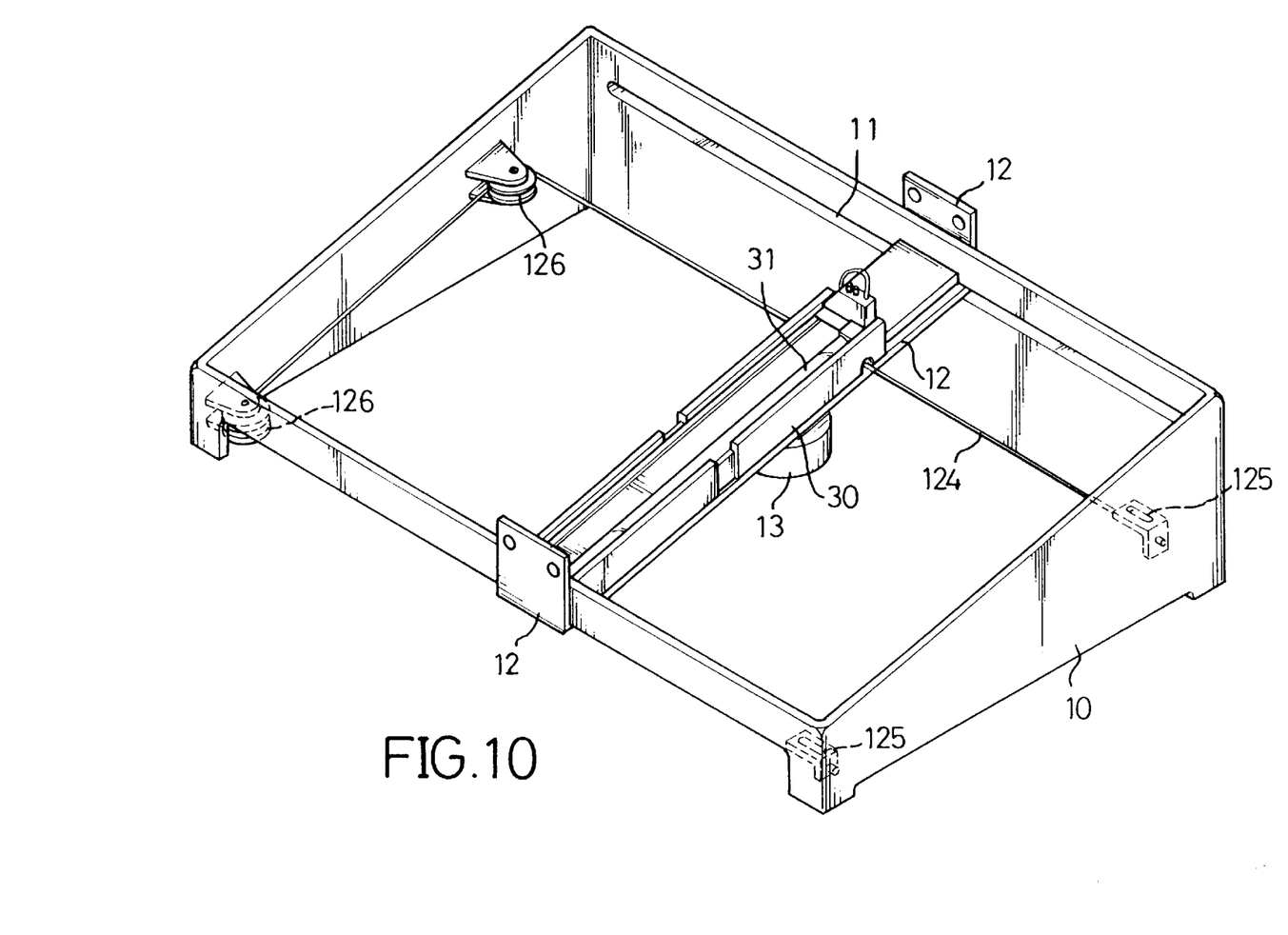
FIG. 10 is a perspective view of the image scanner which utilizes a CCD image sensor according to another embodiment of the present application.

Instead of utilizing a CIS type sensor in this preferred embodiment, a CCD type sensor also can be used as the linear optical sensor 40 of the image scanner of the present invention. As shown in FIG. 10, a CCD image sensor is also disposed in the top shell 50 and is mainly composed of a lamp 61, several reflecting mirrors 62, 63 and 64, a focusing lens 65 and CCD sensors 66. Therefore, the document 21 can be directly scanned by the CCD type optical sensor without a glass plate being located therebetween.

Therefore, the image scanner of the present invention can directly scan via an image sensor disposed above the glass plate a document received on a glass plate. The optical error problem due to the glass plate in the conventional image scanner can be obviated by the image scanner of the present invention.

While the present invention has been explained in relation to its preferred embodiment, it is to be understood that various modifications thereof will be apparent to those skilled in the art upon reading this specification. For example, as a document is directly scanned by an image sensor disposed above a plate which receives the document, the plate need not to be transparent like the glass plate in the above preferred embodiment. Therefore, it is to be understood that the invention disclosed herein is intended to cover all such modifications as fall within the scope of the appended claims.

What is claimed is:

1. An image scanner comprising:

a base having a front wall and a rear wall;

a plate disposed on the base for the placement of a document which has a first surface to be scanned and is placed on the plate in a manner that the first surface faces upwardly relative to the plate;

a transmitting stand disposed within the base and being capable of laterally moving therein;

a top shell located above both of the plate and the base and extending to the front and rear walls of the base, the top shell being drivingly coupled with the transmitting stand to be laterally movable; and an optical sensing unit disposed in the top shell and comprising a lighting unit and a receiving unit, the lighting unit having a light emitting side and the receiving unit having a light receiving side with both the light emitting and receiving sides facing the first surface of the document to directly scan the document placed on the plate.

2. An image scanner of claim 1, wherein the transmitting stand includes a transmitting motor, a plurality of gear wheels, a plurality of pulleys and a cord, wherein said gear wheels are rotatably connected to and driven by the transmitting motor, and said pulleys are operatively connected to the gear wheels via the cord so that the transmitting stand is driven by the transmitting motor to laterally move in the base.

3. An image scanner of claim 1, wherein the plate is transparent.

4. An image scanner of claim 3, wherein the transmitting stand includes a lamp seat for receiving a lamp that is utilized while a transparent document is scanned.

5. An image scanner of claim 1, further comprising at least one document clamping mechanism disposed on one side of the base for clamping the document to the plate.

6. An image scanner of claim 5, wherein the document clamping mechanism comprises a pressing strip for clamping the document and a control piece disposed on the pressing strip for controlling the clamping operation of the pressing strip.

7. An image scanner of claim 6, wherein the document clamping mechanism further comprises an elastic piece for enabling the pressing strip to press against the plate.

8. An image scanner of claim 1, wherein the optical sensing unit is a CIS-type image sensor.

9. An image scanner of claim 1, wherein the optical sensing unit is a CCD-type image sensor.

* * * * *